(12) United States Patent
Gross (10) Patent No.: US 6,475,414 B1
(45) Date of Patent: Nov. 5, 2002

(54) METHOD OF EXTRACTING A MELT STRAND

(76) Inventor: Heinz Gross, Ringstrasse 137, D-64380, Rossdorf (DE)

( * ) Notice: Subject to any disclaimer, the term of this patent is extended or adjusted under 35 U.S.C. 154(b) by 0 days.

(21) Appl. No.: 09/573,637

(22) Filed: May 17, 2000

Related U.S. Application Data (62) Division of application No. 09/043,605, filed as application No. PCT/EP96/04183 on Sep. 25, 1996, now Pat. No. 6,099,290.

(30) Foreign Application Priority Data

Sep. 27, 1995 (DE) .......................................... 195 35 930

(51) Int. Cl.$^7$ ............................................... B29C 47/16
(52) U.S. Cl. ................ 264/40.5; 264/167; 264/177.16; 425/465; 425/466
(58) Field of Search ............................. 264/40.5, 167, 264/176.1, 177.16, 209.8; 425/382.4, 461, 465, 466

(56) References Cited

U.S. PATENT DOCUMENTS

| | | | |
|---|---|---|---|
| 3,850,568 A | | 11/1974 | Bartha et al. |
| 3,884,611 A | | 5/1975 | Anderson et al. |
| 3,940,221 A | * | 2/1976 | Nissel ........................ 425/141 |
| 4,439,125 A | | 3/1984 | Dieckmann et al. |
| 4,518,343 A | | 5/1985 | Seiffert |
| 4,594,063 A | * | 6/1986 | Reifenhauser et al. ... 264/176.1 |
| 5,229,140 A | * | 7/1993 | Crass et al. ................. 264/40.6 |
| 5,511,962 A | * | 4/1996 | Lippert ........................ 425/141 |
| 5,622,730 A | * | 4/1997 | Nitta et al. ................. 264/40.1 |
| 5,679,383 A | * | 10/1997 | Ryan et al. .................. 264/167 |
| 5,770,129 A | * | 6/1998 | Monti ........................ 264/40.1 |
| 5,788,998 A | | 8/1998 | Gross |
| 5,814,258 A | * | 9/1998 | Ogawa et al. ......... 264/173.12 |
| 6,099,290 A | * | 8/2000 | Gross ........................ 425/382.4 |

FOREIGN PATENT DOCUMENTS

| | | |
|---|---|---|
| DE | 1 125 146 | 8/1959 |
| DE | 1 231 412 | 12/1966 |
| DE | 2 305 877 | 8/1973 |
| DE | 35 30 383 | 3/1987 |
| DE | 40 20 728 | 1/1991 |
| DE | 40 20 728 A1 | 1/1991 |
| DE | 94 08 463.7 | 9/1994 |
| DE | 44 00 069 | 4/1995 |
| DE | 295 00 803.2 | 4/1995 |
| DE | 295 14 043 | 1/1996 |
| EP | 0 367 022 | 5/1990 |

* cited by examiner

*Primary Examiner*—Mark Eashoo
(74) *Attorney, Agent, or Firm*—Browdy and Neimark, P.L.L.C.

(57) ABSTRACT

The geometry of a flow channel (1) can be varied within wide limits if at least one wall of the flow channel (1) takes the form of a sheet stack (2) which is pushed from the rear into the channel to a greater or lesser extent by means of adjusters (7). The adjustment may be effected either uniformly over the entire width of the flow channel (1) or only locally at certain points thereof. It is thus possible, while a medium is passing through the flow channel (1), to alter form outside the flow resistance either of the entire channel or only at certain points and thus alter the entire mass flow or the mass flow distribution as desired. New processing possibilities are given by the greater flexibility of the sheet stack (2) in relation to solid channel walls.

11 Claims, 8 Drawing Sheets

METHOD OF EXTRACTING A MELT STRAND

CROSS-REFERENCE TO RELATED APPLICATIONS

This is a division of co-pending parent application Ser. No. 09/043,605, filed Mar. 24, 1998 as international application PCT/EP96/04183, on Sep. 25, 1996, and nationalized in the U.S. on Mar. 24, 1998, which issued as U.S. Pat. No. 6,099,290 on Aug. 8, 2000.

FIELD OF THE INVENTION

The invention relates to an apparatus in the form of a tool comprising a flow channel.

REVIEW OF THE RELATED ART

No method has been known so far in which to change the width of the melt strand during extraction by modification of the geometry of the flow channel in the tool.

Various types of apparatuses as described above have been known. They are used especially in the field of plastics processing in flow channels for thermoplastic melts for the possibility of modification of flow channel resistance. EP 0 367 022, DE 35 30 383 A1, DE 44 00 069 C1 and DE-AS 12 1 412 teach extrusion dies in which to change the flow channel height. These known solutions comprise a more or less thick, solid, one-piece metal wall which can be deformed by adjusters pressing on the wall from the rear. They work only as long as the solid wall, during deformation, does not exceed the range of linear elasticity because they depend on the fact that upon return motion of the adjusters, the wall will take precisely its original initial position. Because of the comparatively thick wall required in these apparatuses for reasons of solidity, the possibilities of uniform adjustment of the wall over the entire width of the flow channel (overall adjustment) are restricted as well as the locally defined adjustment of a small portion of the wall (relative adjustment).

DE-OS 23 05 877 describes a limitation of a flow channel which consists of several thin individual sheets lying one upon the other over their full surfaces and consequently possesses higher flexibility. But this flexibility is purchased by this solution abandoning the important criterion of absolute leak-tightness towards the fluid flowing in the flow channel, because mobility of all the individual sheets in the marginal areas is required for adjustment. To this end, the marginal areas of the sheets reach into grooves which are located between the two halves of the flow channel body. The surface pressure necessary for leak-tightness in these marginal areas cannot be applied, because it would not allow any motion of the sheets relative to the flow channel halves.

Consequently, solutions offering a wide adjusting range accompanied with absolute leak-tightness of the flow channel have not been disclosed in the known apparatuses of the generic type. The known apparatuses neither offer the possibility to put a method into practice in which a melt strand is forced through an absolutely leak-tight tool channel, two independent adjusting systems, which are integrated in the tool and act on a wall of the flow channel, serving to modify the thickness of the melt strand during melt discharge either in its entirety or only locally at certain places or to change both simultaneously, nor to change the width of the melt strand during extraction by changing the geometry of the flow channel in the tool.

SUMMARY OF THE INVENTION

The invention relates to a flow channel with a width or circumference-to-height ratio greater than 10, and a mechanism for the absolutely leak-tight limitation of a flat flow channel. The mechanism insures that, by means of externally accessible adjusters, at least one flow channel wall can be adjusted in its overall position to the largest extent possible, i.e., uniformly over the entire width, as well as locally, i.e., in strictly defined portions over the width, in relation to the opposite demarcation of the flow channel.

The invention further relates to a method, using another embodiment of the invention, for continuously discharging a melt strand by means of a tool having at least one adjustable wall, in which, during the discharge of the melt, the height of the entire flow channel is adjusted by a first adjusting system and portions of the flow channel are adjusted by a second adjusting system independent of the first adjusting system and using a second control system. With this method, during the discharge the thickness of the melt strand changes entirely, or only locally at certain places, or both changes take place simultaneously.

It is the object of the invention to embody an apparatus of the generic type in such a way that increased ranges of overall and relative adjustment are possible, accompanied with simultaneous absolute leak-tightness of the apparatus, and based on this to develop methods by which, during extraction, a melt strand can be modified in thickness entirely or locally as well as in width.

According to the invention, this object is attained in that adjusters act from behind on a flexible flow channel wall which is produced by individual sheets being placed one upon the other over their full surfaces, the individual sheet that the fluid flows along being a flow channel sheet which cooperates with the flow channel to form a wall and is firmly welded into the flow channel body all around.

The method of discharging a melt strand is put into practice in that during the production of the melt strand by means of a tool, the height of the outlet gap of the tool is modified over the entire width or only locally during the melt extraction by means of two independent adjusters which act on at least one of the two outlet lips so that during the time of extraction, the melt strand can be modified in thickness entirely or locally as well as in width.

The term sheet stack means a stack of sheets, the undersides of each of which resting tightly on the top sides of the sheet underneath. In one embodiment, a sheet, one surface of which forms a flow channel wall, can also be integrated in a frame which is integrated in the flow channel by screwing, welding or in a similarly leak-tight way. In another embodiment, the desired flexibility of the sheet stack is obtained by the individual sheets having a thickness of less than 2 mm, preferably less than 1 mm. In one embodiment, it can be functional for the apparatus that at least one of the edges of the individual sheets is welded together with a frame or the body into which the flow channel is integrated. As regards the flexibility of the sheet stack, the present invention provides by special advantage that the stack to has a curvature instead of being plane. The invention also provides another extension of the adjusting range is attained by the adjusters being bonded to the sheet stack non-positively so that the latter can be deformed by traction and pressure.

The invention provides a special provides a special advantage by using two independent adjusters acting on a flexible wall of the apparatus, it being possible, by the aid of the first adjusters, to effect uniform adjustment of the wall over the entire width and additionally, by the aid of the second adjusters, to deform the wall locally over the width. Maximum adjustment is attained if, two independent adjusters act on two walls of the flow channel, it being possible to effect a uniform adjustment of the respective wall over the entire width by means of the first adjusters and additionally to deform the respective wall locally defined over the width by means of the second adjusters. The non-positive integration once again enlarges the adjusting range, because thus the wall cannot only be pressed into the flow channel, but can also be retracted.

BRIEF DESCRIPTION OF THE DRAWING FIGURES

Further details of the invention will become apparent from the ensuing description of some exemplary embodiments, taken in conjunction with the drawing, in which.

DETAILED DESCRIPTION OF THE PREFERRED EMBODIMENTS

Figure 1:
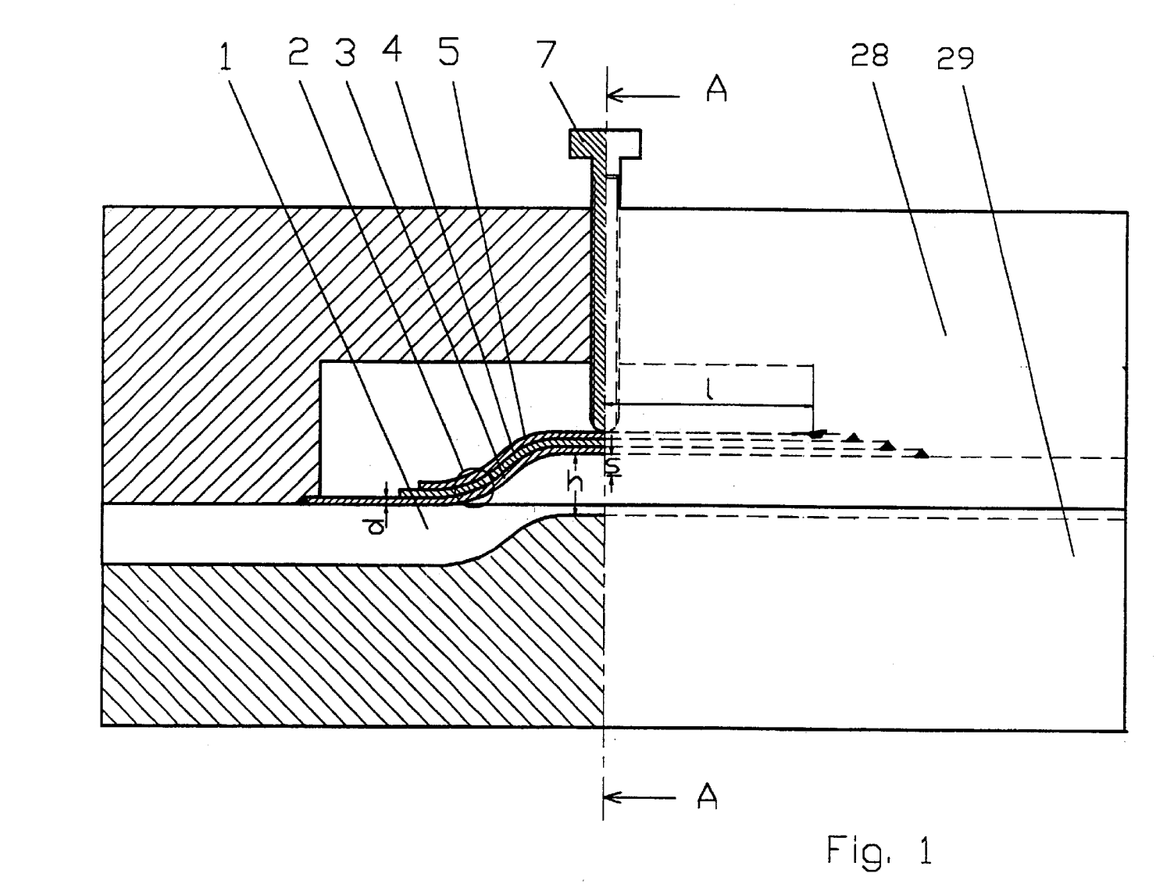
FIG. 1 is a partially sectional illustration of an apparatus according to the invention inside a flow channel.

As seen in FIG. 1, the apparatus for the variable limitation of a flat flow channel is located within a tool that consists of an upper 28 and a lower tool half 29. The flow channel 1 possesses at least one wall constituted by a stack 2 of thin individual sheets 3, 4 and 5. The stack 2 is again composed of a flow channel sheet 3, which has a wall together with the flow channel and which, for reasons of leak-tightness toward the fluid flowing in the flow channel, is firmly welded all around into the tool half 28, as well as of at least one supporting sheet 4. On principle, other methods of joining the flow channel sheet 3 to the tool half 28 that constitutes the flow channel 1 can be used as well, as long as these methods ensure absolute leak-tightness toward the fluid flowing in the flow channel 1. Depending on the application, any number of further supporting sheets 4 and 5 can be utilized. The supporting sheets 4 and 5 are welded together with, or joined to, the tool half 28 only on one side, however, they can also simply be placed on the flow channel sheet. Non-positive or positive engagement should however ensure that at least at a point or on a line, motions of the individual sheets 3–5 relative to each other do not occur for the general position of the individual sheets relative to each other to be secured. For the balancing in length, required during deformation, of the individual sheets 3–5 relative to each other to be possible, the surfaces of the individual sheets 3–5 should allow displacement relative to each other at least in portions. The individual sheets 3–5 may consist of metallic materials, in this case in particular of elastic spring steels, however, they may also consist of other materials for instance of plastics. Also, they need not consist all of the same material.

The sheet thickness d of the individual sheets 3–5 depends on the respective application and the selected material. In the case of metals, for a high degree of possible deformation, it should regularly be less than or equal to 2 mm, preferably less than or equal to 1 mm. The thickness d of the individual sheets 3–5 need not necessarily be the same, as the case may be, the use of sheets of gradually varying thicknesses d can be advantageous. The sheet stack 2 can be plane, but by advantage it is curved as seen in FIG. 1, the curvature reducing the formation of tensile stresses specifically in the flow channel sheet 3 that is fixed by welding. Adjusters 7 act on the sheet stack 2 from behind, by means of which the position of the sheet stack can be altered. It is advisable that the length 1 from the beginning of the sheet stack 2 as far as to the point of application of force of the adjusters 7 be as long as possible so as to obtain a wide adjusting ranges. It should be at least 20 mm, preferably it should be greater than 30 mm.

Figure 2:
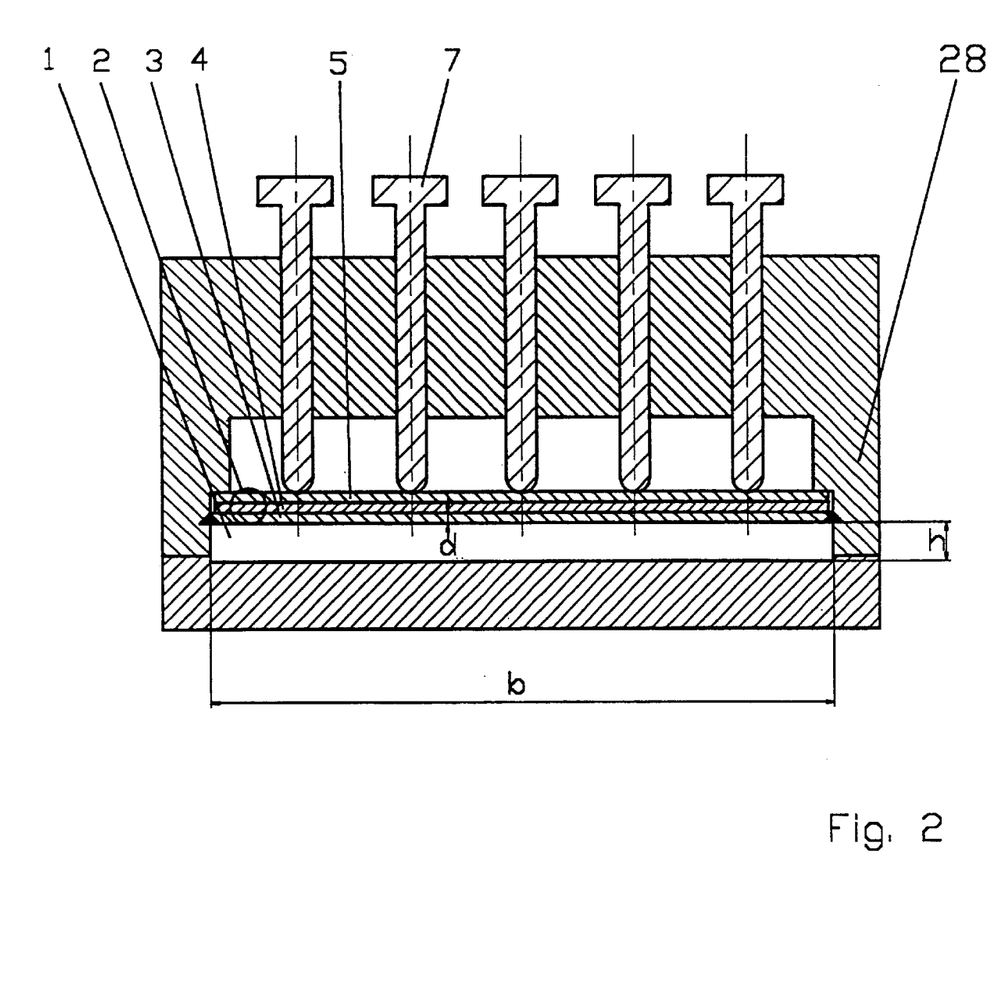
FIG. 2 is a view of the section A—A of FIG. 1.

There is a variety of adjusters that can be employed. In the simplest of cases, they can be screws as seen in picture 1, but use can also be made of expansion bolts, motors, piezo translators or the like. On principle, the adjusting ranges can also be generated by a fluid. One adjuster is sufficient for the apparatus to be able to work, however, it is advantageous to use several adjusters positioned at a defined distance from each other over the width b of the channel as seen in FIG. 2. This figure shows the cross-section of the flow channel 1 corresponding to the section A—A of FIG. 1. Noticeably, several adjusting screws 7 integrated in the upper half of the tool 28 by way of a thread act from above on the sheet stack 2. FIG. 2 also illustrates that the supporting sheets 4 and 5 of the sheet stack 2 are not connected with the tool half 28 laterally. The term flat flow channel means a flow channel of a width b to height h ratio of at least 10. The flow channel may also be round. In this case, the mean flow channel circumference is employed instead of the flow channel width to determine the ratio.

Figure 3:
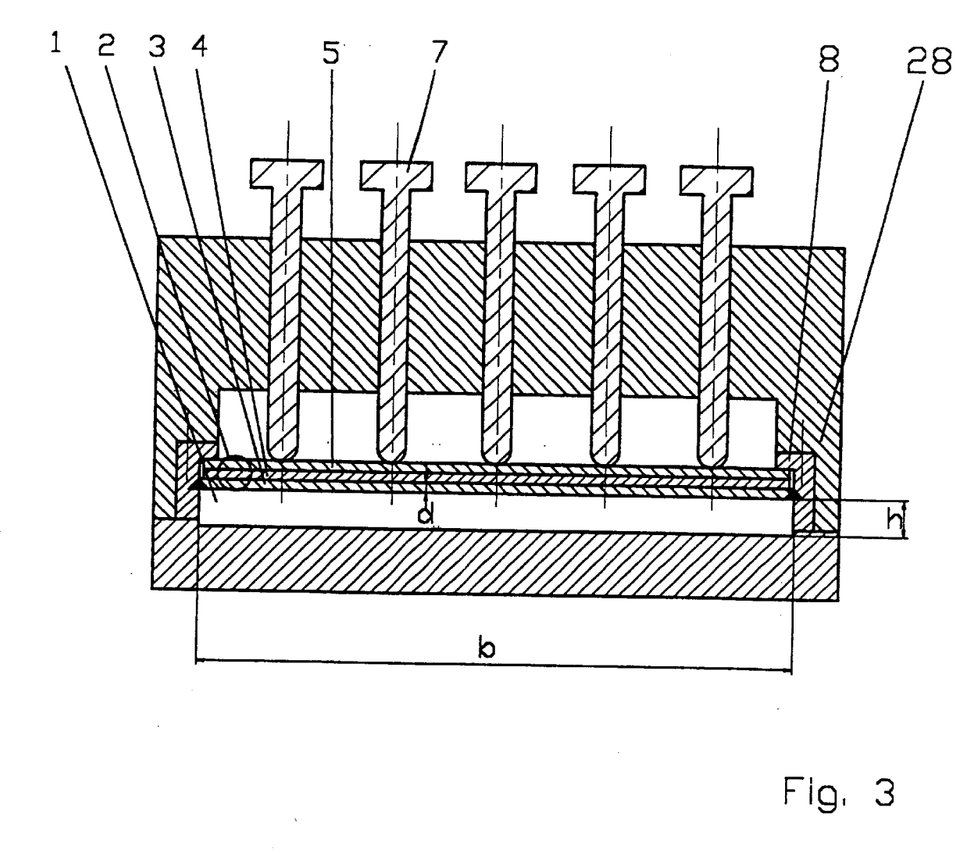
FIG. 3 is an illustration of another constructional solution of the apparatus according to the invention, in which the sheet stack in welded in a separate frame.

FIG. 3 shows another type of integration of the sheet stack 2 in the tool half 28. In this case, the sheet stack 2, on which the adjusting screws 7 act from above for adjustment of the geometry of the flow channel 1, is 5 welded in a separate frame 8 which is then screwed into the tool half 28. This solution has the advantage that the sheet stack 2 can easily be replaced.

Figure 4:
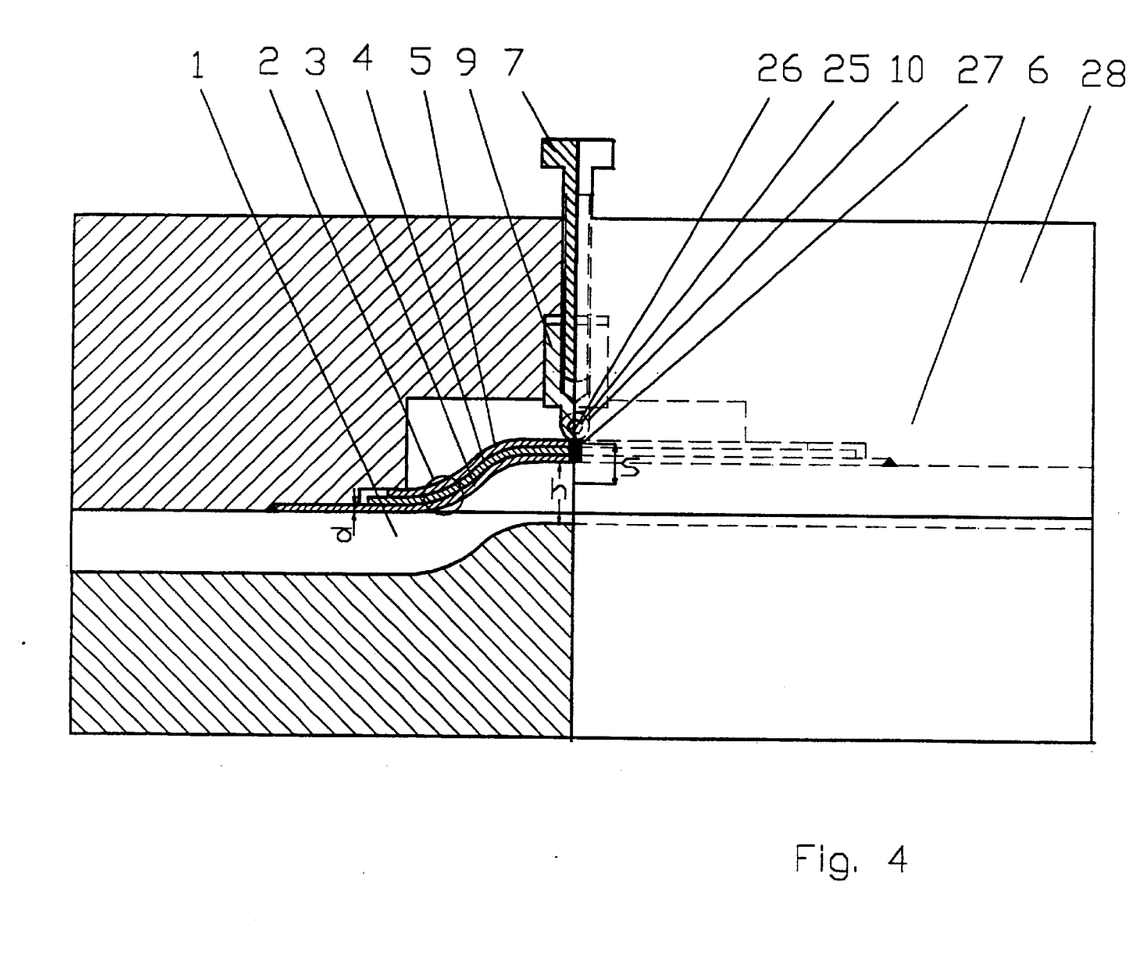
FIG. 4 is an illustration of another constructional solution of the apparatus according to the invention with the adjusting screws being integrated for traction and pressure.

FIG. 4 illustrates the apparatus of FIG. 1 with a still enlarged adjusting area. In this case, the sheet stack 2 is positively connected with the threaded sleeves 9 by means of a partially slit pipe 10 which is welded on. Positive engagement is produced by a round rod 26 being inserted in the pipe 10, the lower portion 27 of which and the sheet stack are welded together and which is partially slit as far as to the depth of the sheet stack; the round rod 26 is passed through the eyelets 25 which are located at the end of the threaded sleeves 9 and reach into these slits. The height h of the flow channel 1 can be increased as well as reduced by the adjusting screws 7, which support themselves by a thread in the upper tool half 28 and reach into the threaded sleeves 9 by their lower portion. Outside of the welded portion 27, the surfaces of the individual sheets 3–5 can move relative to each other, as a result of which the high flexibility within the sheet stack 2 is maintained. In the case of this solution, the supporting sheets 3, 4, 5 and the tool half are not welded together. An advantage of the positive integration resides in that the flow channel height h cannot only be reduced, but also increased. Furthermore, one does not depend on the elastic restoring of the sheet stack so that the possible adjusting ranges can still be greater. In the case of sheet stacks of surfaces of great dimensions, this construction serves to achieve adjusting ranges of more than 20 mm.

Figure 5:
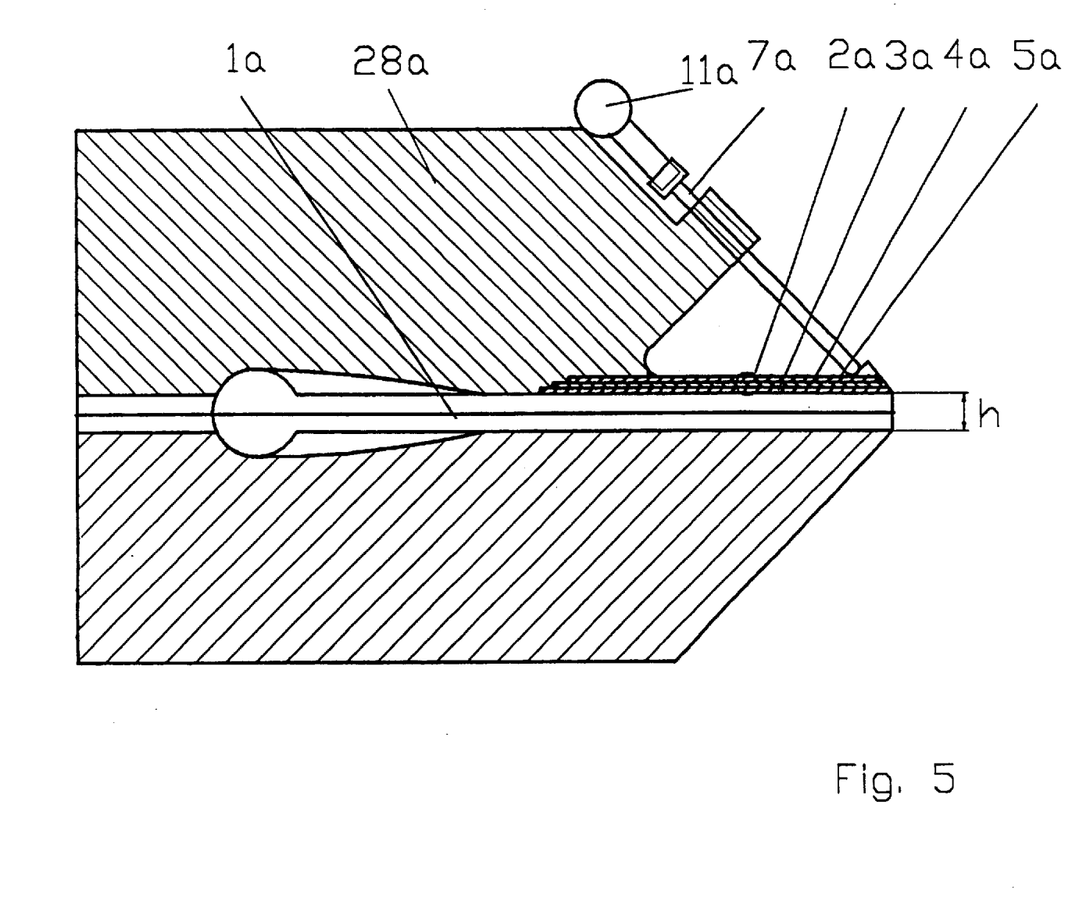
FIG. 5 is a sectional view through an overture of the apparatus according to the invention which is located at the end of a flow channel.

For clear identification, items of identical function have the same reference numeral added by a different letter for each drawing as from FIG. 5. FIG. 5 shows a section through an overture of an adjusting mechanism according to the invention which is located at the end of a flow channel. The end of the sheet stack 2a simultaneously forms the end of the flow channel 1a. The adjusting screws 7a, which lodge in a thread in the upper tool half 28a, again act from above on the sheet stack 2a with the individual sheets 3a, 4a and 5a. The height h of the flow channel 1a can be reduced by manual rotation or by rotation by means of a servomotor 11a.

Figure 6:
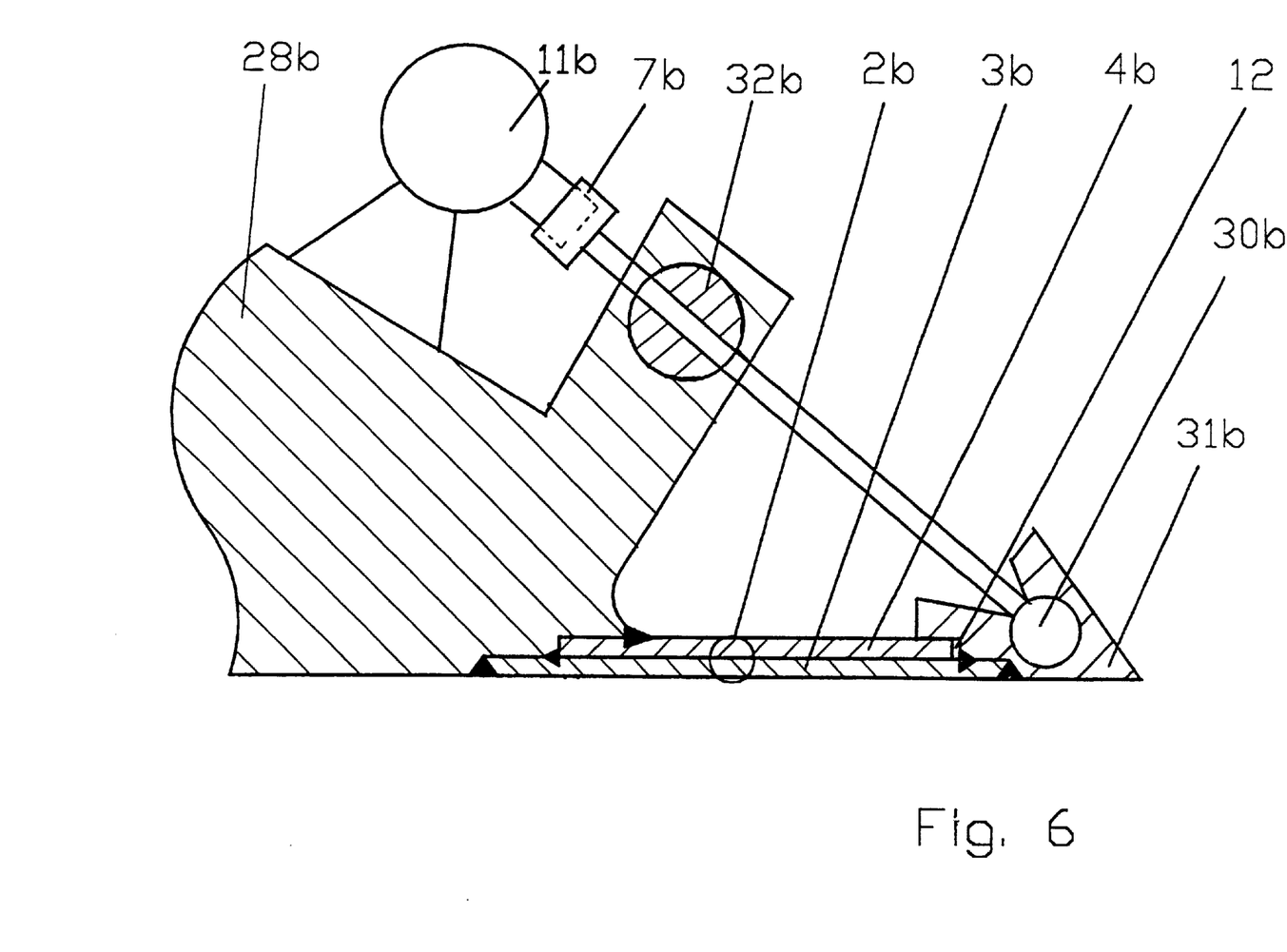
FIG. 6 is a sectional view of another example of an adjuster ensuring adjustment of the wall by traction and pressure.

FIG. 6 is a sectional view of another mechanism for adjusting the position of the sheet stack 2b. By reason of the positive engagement of the adjusting screws 7b with the profiled strip 31b, which is fixed to the flow channel sheet 3b by welding, the position of the sheet stack 2b can be altered by means of traction or pressure. To this end, balls 30b are welded on the extremities of the adjusting screws 7b, lodging in a hole of a profiled strip 31b which is fixed to the sheet stack 2b by welding. The adjusting screws 7b are connected by way of a thread in a cylinder piece 32b. The cylinder piece 32b again lodges in a hole of the upper tool member 28b. By rotation of the adjusting screws manually or by means of a servomotor 11b, the sheet stack 2b can be pulled upwards or pressed down. The covering sheet 4b is not welded together with the profiled strip 31b. It rests in a groove between the profiled strip 31b and the flow channel sheet 3b. At the end of this groove, a gap 12 remains between the covering sheet 4b and the profiled strip 31b for the flexibility of the sheet stack 2b to be maintained.

Figure 7:
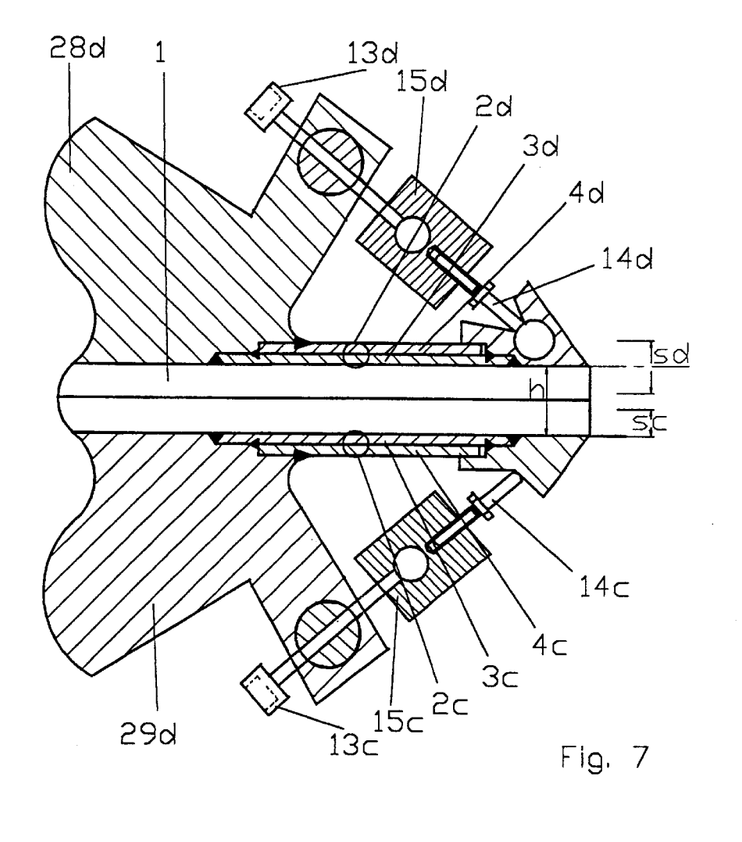
FIG. 7 is a detail of a tool, in which both tool walls are provided with an adjuster, these adjusters each having independent adjusting screws for overall adjustment or relative adjustment.

FIG. 7 is a sectional view of an example of a tool having two opposed adjustable walls. In this solution, two independent adjusters 13c, 13d and 14c, 14d act on the sheet stacks 2c, 2d, the adjusters 13c, 13d only consisting of two adjusting screws which are positioned on both edges of the tool. By the aid of these screws, the adjusting beams 15c, 15d can be displaced in their entirety, i.e. the sheet stacks 2c, 2d too are bent over their full widths. A plurality of adjusters 14c, 14d is disposed between the adjusting beams 15c, 15d and the sheet stacks 2c, 2d over the width of the apparatus, by means of which the sheet stacks 2c, 2d can be displaced additionally at defined places and locally limited. Seen from the neutral position of the sheet stack 2c, the solution c only permits a reduction of the flow channel height h by the adjusting range sc. Again it works only as long as complete elastic restoring of the sheet stack 2c is ensured. However, it offers a maximum of adjusting and operating convenience, since the overall and the relative adjustment are decoupled, it being possible to adjust the flow channel height h as a whole while relative adjustment is maintained, which is frequently required in practice. On principle, this solution can also be put into practice where a solid flow channel wall is available instead of a sheet stack. The sheet stack only provides for a still enlarged adjusting range. Again, the construction can be integrated only into one flow channel wall or also into two flow channel walls. The same is valid for the embodiment d, in which the adjusters 13d and 14d are positively joined to the adjusting beam 15d and the sheet stack 2d, respectively. This solution offers a maximum of possible adjustment when it is integrated in two flow channel walls, since, as explained in connection with FIG. 6, it also offers the possibility to enlarge the flow channel height h by means of the adjusting screws 13d and 14d. The adjusting range sd to be achieved amounts to more than twice the adjusting range sc, since in this construction, the sheet stack 2d can also be deformed plastically to some minor degree. Adjusting ranges greater than 10 mm are achievable.

Figure 8:
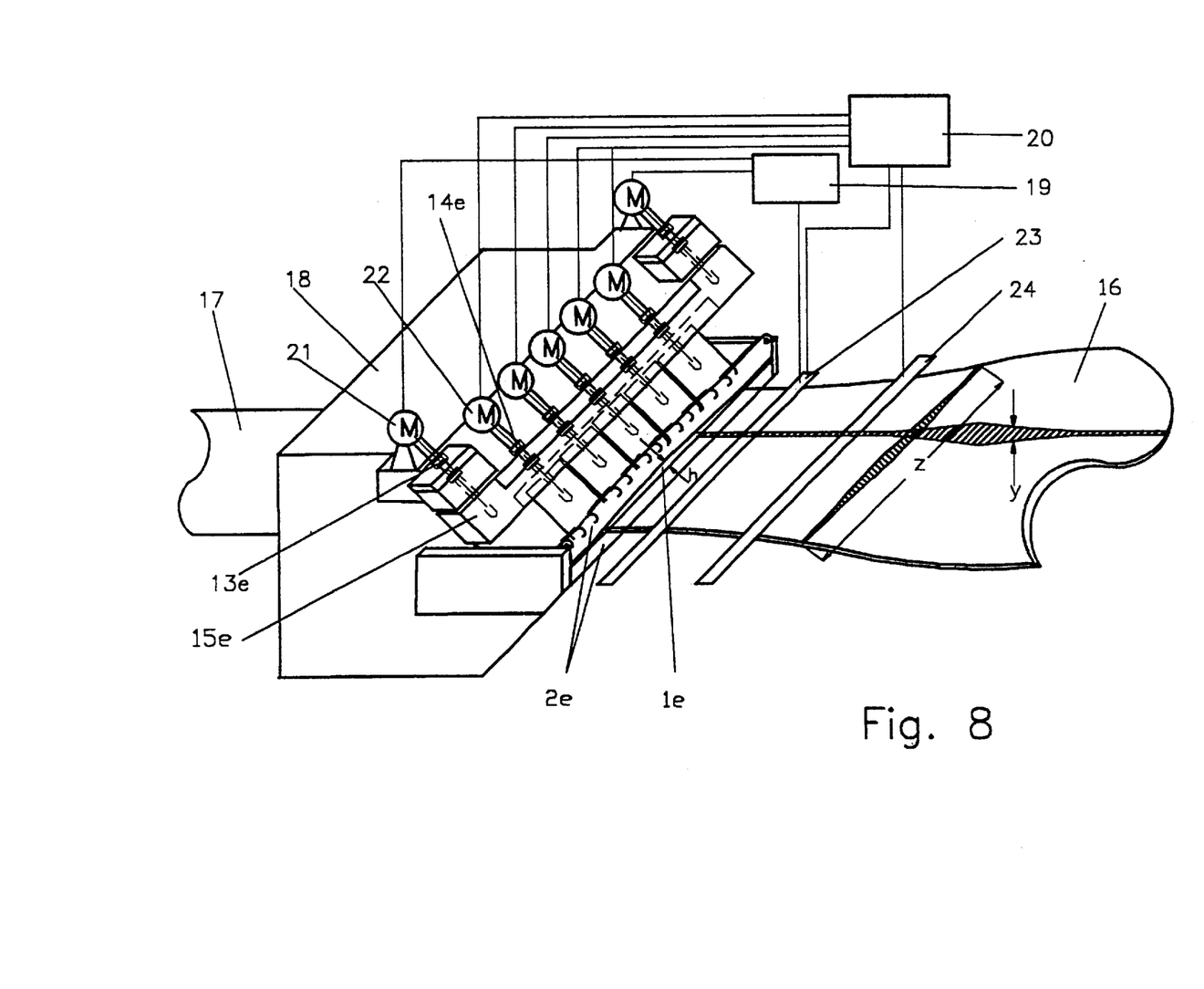
FIG. 8 is an illustration, roughly outlined, of a method for the controlled extraction of a melt strand of variable geometry.

FIG. 8 sketches a method of extracting a melt strand of variable geometry. New processing possibilities are offered by the considerably increased adjusting range achievable by the apparatuses specified and the integration of two independent and positively engaged adjusters 13e and 14e, which act on at least one flexible wall 2e of a flow channel 1e. By way of example, the sketch illustrates a method according to the invention for the discharge of a melt strand 16, it being possible to change the thickness y and the width z of the melt strand 16 during extraction. In this case, an extruder 17 serves to convey the melt by pressure through a tool 18. The flow channel 1e is located in the tool 18 and has the flexible wall 2e, the position of which can be varied by independent adjusters 13e and 14e. Of course, the flow channel 1e may also have a different geometric shape. It can for instance be round. By means of the adjusters 13e, which act on the adjusting beam 15e, the height h of the outlet gap can be uniformly increased or reduced over the entire width during the discharge of the melt. The adjusting range should be greater than 8 mm, preferably greater than 12 mm. By means of the adjusters 14e, which are integrated in the adjusting beam 15e, the wall 2e can be adjusted additionally locally at certain places over the width around the position adjusted by means of the adjusters 13e. In this case, an adjusting range greater than 2 mm, preferably greater than 4 mm, should be available.

On principle, both adjustments can be made manually. As a rule, it is however sensible to make this adjustment by way of a control unit 19 and 20, respectively. To this end, every adjuster is connected with a triggerable actuator 21 and 22, respectively. For the controlled operation, the thickness y and the width z of the melt strand 16 must be detected continuously. During the extraction of the melt, the thickness y is detected by a thickness measuring unit 23 and the width z by a width measuring unit 24 and passed to the control unit, which then performs a variance comparison, determines the new correcting variables and passes them to the actuators 21 and 22, respectively. In cases where extremely wide adjusting ranges are required, it is advantageous to design both walls 2e of the flow channel 1e to be flexible and to provide them with adjusters 13 as well as control units 19 and 20, respectively. This is of special advantage when during melt extraction also the width z of the melt strand 16 is to be altered simultaneously. The method can for instance be used to fill compression molds of complex geometry with melt, the compression mold and the discharger moving relative to each other. In the field of extrusion blow molding, the method can be used so as to effect, during the tube discharging job, time dependent profiling of the preform in the circumferential direction in addition to the known time dependent profiling of the preform in the direction of extrusion. Thus, the thickness ratio originating in the blow mold can be influenced positively to a considerably improved degree.

What is claimed is:

1. A method of extracting a melt strand (16) of a melt, in which the melt is conveyed under pressure through a tool (18) provided with a flat flow channel, and in which the melt leaves the tool (18) by way of an outlet gap which has at least one adjustable wall (2e), a height (h) and a width, wherein during melt extraction by local modification of the position of the at least one adjustable wall (2e), the height (h) of the outlet gap is adjusted over the entire width of the outlet gap by a first adjusting system (13e) and locally over the width of the outlet gap by a second adjusting system (14e) independent of the first adjusting system (13e) so that during the time of extraction, the thickness (y) of the melt strand (16) changes over the entire width of the melt strand (16) or only at locally defined places; and wherein the first adjusting system (13e) and the second adjusting system (14e) are independent of each other and act on the same at least one adjustable wall (2e).

2. A method according to claim 1, wherein the height (h) of the outlet gap is closed to 0 mm in at least one marginal portion of the tool (18) during melt extraction so that the width (z) of the melt strand (16) changes timed during the extraction.

3. A method according to claim 2, wherein the height (h) of the flow channel (1e) is adjusted by more than 2 mm locally around a central position adjusted by the first adjusting system (13e).

4. A method according to claim 3, wherein by way of control units (19 and 20, respectively) and based on predetermined algorithms, the height (h) of the outlet gap is controlled over the width of the outlet gap by said first adjusting system (13e) and said second adjusting system (14e), which are independent of each other and act on the same at least one adjustable wall (2e).

5. A method according to claim 1, wherein the height (h) of the outlet gap is adjusted by more than 2 mm locally around a central position adjusted by the first adjusting system (13e).

6. A method according to claim 5, wherein by way of control units (19 and 20, respectively) and based on predetermined algorithms, the height (h) of the outlet gap is controlled over the width of the outlet gap by at least one of said first adjusting system (13e) and said second adjusting system (14e).

7. A method according to claim 1, wherein by way of control units (19 and 20, respectively) and based on predetermined algorithms, the height (h) of the outlet gap is controlled over the width of the outlet gap by at least one of said first adjusting system (13e) and said second adjusting system (14e).

8. A method of extracting a melt strand (16) of a melt, in which the melt is conveyed under pressure through a tool (18) provided with a flat flow channel, and in which the melt leaves the tool (18) by way of an outlet gap which has at least one adjustable wall (2e), a height (h) and a width, wherein during melt extraction by local modification of the position of the at least one adjustable wall (2e), the height (h) of the outlet gap is adjusted over the entire width of the outlet gap by a first adjusting system (13e) and locally over the width of the outlet gap by a second adjusting system (14e) independent of the first adjusting system (13e) so that during the time of extraction, the thickness (y) of the melt strand (16) changes over the entire width of the melt strand (16) or only at locally defined places; and wherein the height (h) of the outlet gap is closed to 99 mm in at least one marginal portion of the tool (18) during melt extraction so that the width (z) of the melt strand (16) changes timed during the extraction.

9. A method according to claim 8, wherein the height (h) of the flow channel (1e) is adjusted by more than 2 mm locally around a central position adjusted by the first adjusting system (13e).

10. A method according to claim 9, wherein by way of control units (19 and 20, respectively) and based on predetermined algorithms, the height (h) of the outlet gap is controlled over the width of the outlet gap by said first adjusting systems (13e) and said second adjusting system (14e), which are independent of each other and act on the same at least one adjustable wall (2e).

11. A method of extracting a melt strand (16) of a melt, in which the melt is conveyed under pressure through a tool (18) provided with a flat flow channel, and in which the melt leaves the tool (18) by way of an outlet gap which has at least one adjustable wall (2e), a height (h) and a width, wherein during melt extraction by local modification of the position of the at least one adjustable wall (2e), the height (h) of the outlet gap is adjusted over the entire width of the outlet gap by a first adjusting system (13e) and locally over the width of the outlet gap by a second adjusting system (14e) independent of the first adjusting system (13e) so that during the time of extraction, the thickness (y) of the melt strand (16) changes over the entire width of the melt strand (16) or only at locally defined places; and wherein by way of control units (19 and 20, respectively) and based on predetermined algorithms, the height (h) of the outlet gap is controlled over the width of the outlet gap by at least one of said first adjusting systems (13e) and said second adjusting system (14e).

* * * * *